Figure 1:
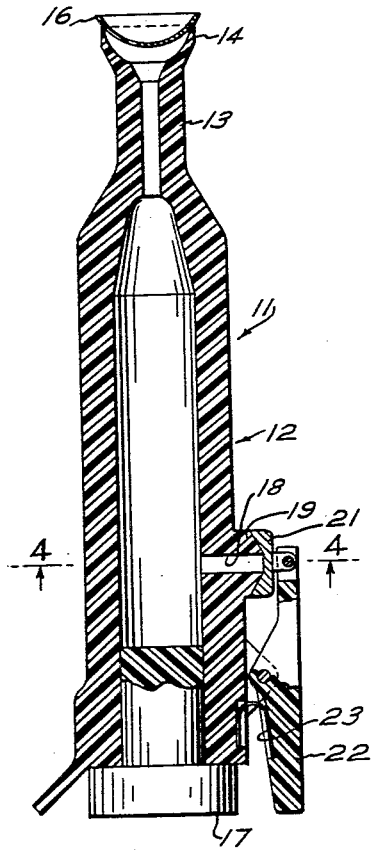

April 21, 1964 A. J. KOBLER 3,129,971
CONTACT LENS APPLICATOR
Filed Feb. 13, 1961 2 Sheets-Sheet 1

INVENTOR.
ARNOLD J. KOBLER
BY
Gardner & Zimmerman
ATTORNEYS

April 21, 1964   A. J. KOBLER   3,129,971
CONTACT LENS APPLICATOR
Filed Feb. 13, 1961   2 Sheets-Sheet 2

INVENTOR.
ARNOLD J. KOBLER
BY
Gardner & Zimmerman
ATTORNEYS

United States Patent Office 3,129,971
Patented Apr. 21, 1964

3,129,971
CONTACT LENS APPLICATOR
Arnold J. Kobler, 706 Clay St., Fairbanks, Alaska
Filed Feb. 13, 1961, Ser. No. 88,702
8 Claims. (Cl. 294—64)

This invention relates to a device for inserting a contact lens in proper position against an eyeball.

In order to overcome the great difficulty experienced by the users of contact lenses in applying the lenses to the eyes, a variety of devices for manipulating the lenses have been developed. However, with these existing manipulating devices it has been difficult to retain the lens in the device until such time as the lens is precisely positioned and properly oriented against the eyeball and therefore release of the lens desired.

It is therefore a principal object of the present invention to provide an improved contact lens applicator having provision for the absolute retention of the lens until the precise instant that it is desired to apply the lens to the eye.

Another object of the invention is the provision of a contact lens applicator of the class described which is arranged such that the proper positioning of the lens can be ascertained by the eye of the user by bringing the applicator with lens retained thereon to the eye in the manner of a telescope.

It is still another object of the invention to provide a contact lens applicator having an easily manipulated lens releasing mechanism.

Yet another object of the invention is the provision of a contact lens applicator which provides a positive lens inserting action.

One other object of the invention is to provide a contact lens applicator which is not abusive to the lens or eye.

It is a further object of the invention to provide a contact lens applicator of the class described that is extremely simple and economical in construction.

The invention possesses other objects and features of advantage, some of which, with the foregoing, will be set forth in the following description of the preferred form of the invention which is illustrated in the drawing accompanying and forming part of the specification. It is to be understood, however, that variations in the showing made by the said drawings and description may be adopted within the scope of the invention as set forth in the claims.

Figure 2:
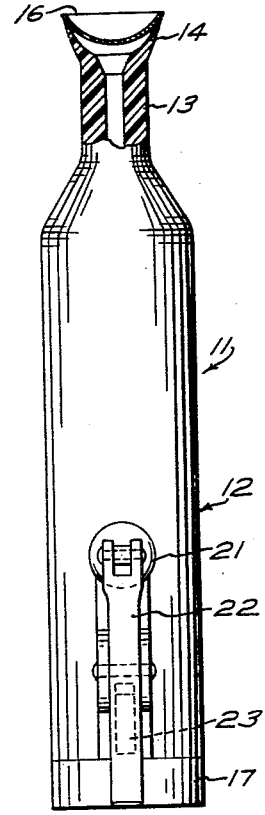
Figure 3:
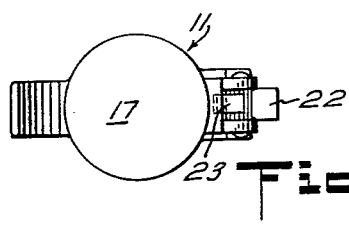
Figure 4:
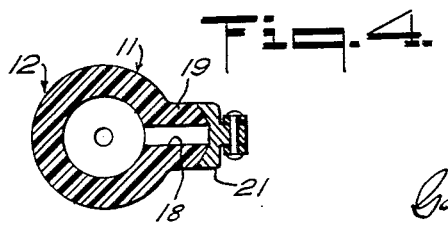
Figure 5:
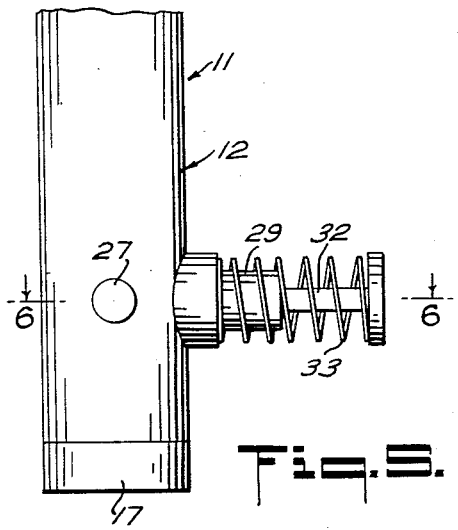
Figure 7:
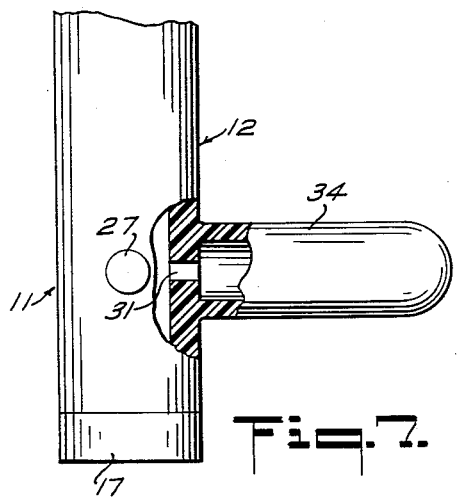
Figure 6:
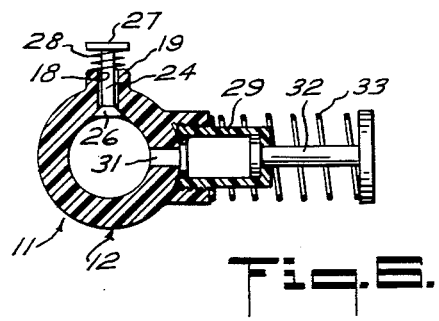
Figure 9:
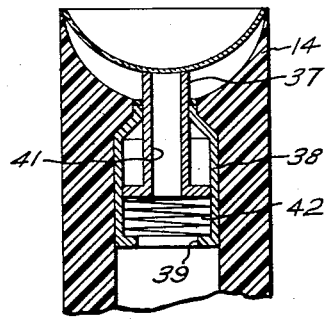
Figure 8:
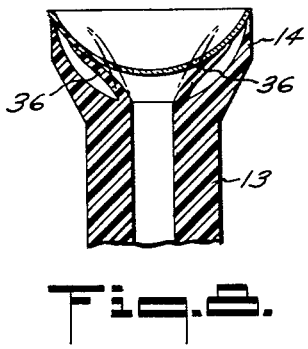

FIGURE 1 is a sectional view along a diametric plane of a preferred embodiment of the contact lens applicator, FIGURE 2 is a side elevational view of this embodiment, FIGURE 3 is an end view of this embodiment, FIGURE 4 is a sectional view taken at line 4—4 of FIGURE 1, FIGURE 5 is a fragmentary side elevational view of an alternative embodiment of the applicator embodying a modified form of lens retaining mechanism and lens releasing mechanism, FIGURE 6 is a sectional view taken at line 6—6 of FIGURE 5, FIGURE 7 is a fragmentary side elevational view of another alternative embodiment of the applicator embodying still another modified form of lens retaining mechanism, FIGURE 8 is a fragmentary sectional view along a diametric plane of a modified form of lens retaining structure, and FIGURE 9 is a view similar to FIGURE 8 but of still another modified form of lens retaining structure.

Considering now the invention in some detail and referring to the illustrated forms thereof in the drawings, there is seen to be provided a contact lens applicator 11 which generally comprises an elongated flexible walled tube 12 closed at one end and having an open ended neck 13 of reduced bore diameter at the other end terminating in a cup 14 for receiving a contact lens 16. The material of tube 12 is soft rubber or other resiliently form retentive material that will assume its normal configuration subsequent to flexing.

In order to positively retain the lens 16 within cup 14 until it is desired to release the lens for application to the eyeball, it will be appreciated that it is only necessary to squeeze the sides of the tube and place the lens upon the cup, then release the tube for return to its normal configuration. The walls of the tube are made of such thickness and in such manner as to insure their retention in normal form or position notwithstanding the subpressure condition in the tube. In this manner, the tube will have the proper rigidity for handling, and also there will be no danger of the walls interfering with the line of vision through the tube. The lens is retained in position by virtue of the strong vacuum or suction thus established within the tube until such time as the tube is vented to atmosphere and the vacuum broken. By virtue of the strong retentivity of the lens within the cup, the tube may be manipulated as desired to properly position the lens relative to an eyeball without danger of the lens being inopportunistically released from the cup.

As a very important feature of the invention, provision is made in the applicator to enable the user to ascertain by eye when the lens is properly positioned. More specifically the closed end of the tube 12 is transparent such that light may enter the tube interior and the user may bring it to the eye in the manner of a telescope, looking through the lens and tube so as to ascertain when the lens is in proper position for application to the eye. To this end, the tube is preferably closed as by means of a transparent plastic plug 17.

Considering now means for releasing the lens and applying it to the eye after same is properly positioned by the applicator in the above described manner, it will be recalled that the lens is released at such time as the tube 12 is vented to atmosphere and the lens retentive vacuum thereby broken. Accordingly, any means for selectively venting the tube may be employed as the lens releasing mechanism. As shown in FIGURES 1 to 4, the selective releasing mechanism may advantageously include a radial passage 18 through the wall of the tube 12 and opening exteriorly at a boss 19 formed integrally therewith. The passage is closed by a cap 21 that normally engages the boss and is selectively disengageable therefrom by means of an operating lever 22. More specifically, the cap is secured to one end of the lever which is pivotally secured in its mid-length region to the wall of the tube. A spring 23 is attached between the tube wall and free end of the lever to urge same outward and thereby normally retain the cap 21 in engagement with the boss 19. The passage 18 is thence rendered normally closed such that the lens retentive vacuum may be established in the tube and the lens positioned against the eyeball by manipulation of the tube in the manner previously described. When the lens is in precisely proper position, it is then only necessary to depress the lever 22 to thus release the vacuum and apply the lens to the eyeball in proper position.

In place of the cap 21 and lever 22 for opening and closing the vent passage 18 and facilitating the selective release of the lens 16 from the applicator, it will be appreciated that the alternative arrangement depicted in FIGURES 5 to 7 may as well be employed. More specifically, a depressible valve stem 24 may be loosely disposed within the passage 18, the stem having an enlarged head 26 at its inner end for sealed engagement with the portions of the inner wall surface circumscribing the passage and an enlarged button portion 27 at its outer end to facilitate ready depression. A spring 28 is then disposed about the stem between the tube boss 19 and button portion 27 to normally urge the stem outward and the head 26 into passage closing engagement with the interior wall surface. To effect release of the lens 16 from the cup, the button portion 27 is hence depressed, thus opening the passage 18 and venting the tube interior to atmosphere.

It will be appreciated that the flexible walled tube 12 that facilitates retention of the lens by vacuum may as well be constructed of rigid or semi-rigid material provided that an additional means is provided to establish vacuum therein. To this end, as depicted in FIGURES 5 and 6, a closed cylinder 29 may be exteriorly secured to the wall of the tube in communication with the tube interior through a passage 31. A plunger 32 is slidably disposed within the cylinder and normally retained at the distal end of its stroke relative to the passage 31 by means of a spring 33. Depression of the plunger forces air from the tube interior in an analogous manner as depression of the tube walls in the previous embodiment. Hence, the lens may be placed upon the cup 14 and the plunger released to retain the lens in position by vacuum.

Alternatively vacuum may be established within the tube by means of a flexible bulb 34 employed in place of the plunger 32 as depicted in FIGURE 7. Such bulb is sealably secured to the wall of the tube in communication with the passage 31 therethrough such that upon depression and release of the bulb suction is established within the tube for retentivity of the lens in the cup 14.

In some instances it is desirable that the lens be applied to the eye with a positive inserting motion and to this end the lens retaining cup 14 may be modified in the manner depicted in FIGURE 8. As shown therein, a plurality of resilient pliant fingers 36 may be provided integrally with the cup to extend upwardly from its base. When vacuum is established within the tube 12 and the lens is positioned in the cup the fingers are urged downwardly into close relation to the cup inner periphery as denoted in full line in the figure. When vacuum is released, however, the fingers spring upwardly to their normally projected positions, as denoted in phantom line, thus imparting a gentle outward thrust to the lens and applying it to the eye with a positive inserting motion.

Positive insertion of the lens may be alternatively accomplished by the modified cup structure illustrated in FIGURE 9 wherein provision is made to thrust the lens outward from the cup by means of a retractable spring loaded plunger 37 in response to release of the vacuum in the tube. More specifically, the plunger is slidably disposed within a generally cylindrical insert 38 secured within the open end of the tube in coaxial communication with the cup 14, the plunger projecting upward from the base of the cup. The insert is provided with an opening 39 in its end and the plunger includes an axial bore 41 to establish free communication between the tube interior and cup. Spring loading of the plunger is facilitated by a relatively weak spring 42 disposed within the insert and arranged to bear against the plunger in a direction to urge same into the cup. The spring is sufficiently weak relative to the suction force applied to the lens upon establishment of vacuum in the tube, however, that the plunger yields to the lens in its vacuum retention in the cup and the spring is compressed. Upon release of the tube vacuum the spring hence expands to urge the plunger outward with the latter in turn applying a positive insertion force to the lens.

What is claimed is:

1. A contact lens applicator comprising a tube having one end closed and transparent and the other end open to receive a contact lens in closing relationship, means for establishing a vacuum in said tube, and means communicating with said tube to selectively vent same to outside atmosphere said last named means including a valve member normally closing a vent passage extending exteriorly from the interior of said tube and a stem secured to said valve member and operable under finger pressure to urge said valve member to an open position relative to said passage.

2. An applicator for a contact lens including a body member provided with a cup-like chamber at an end thereof and a stem portion with an axial bore in communication with said chamber, said chamber having at its outermost end an annular portion adapted to engage the outer peripheral convex portion of a lens, an ejector member movably disposed within said chamber and resiliently urged axially towards said annular portion, said member being adapted to engage a central portion of the convex surface of a lens prior to engagement of said annular portion with said peripheral lens portion, means for selectively creating a vacuum in said bore whereby said ejector member is displaced away from said annular portions and the latter is engaged with said peripheral lens portion, and said ejector member upon release of said vacuum urging the lens outwardly and out of engagement with said annular portion.

3. A contact lens applicator according to claim 2, further defined by said ejector member being a pliable resilient finger projecting upwardly from the base of said cup.

4. A contact lens applicator according to claim 2, further defined by said ejector member being a retractable weakly spring loaded plunger projecting axially from the base of said cup.

5. A contact lens applicator according to claim 2, further defined by said means to vent the tube to atmosphere comprising means including said tube defining a passage extending radially from the tube interior and terminating exteriorly thereof at a boss on the tube side wall, a cap for sealing engagement with said boss, a lever pivotally secured at its mid-length region to said tube with one end secured to said cap and extending generally parallel to said tube along the side thereof, and spring means associated with said lever for normally urging said cap into engagement with said boss.

6. A contact lens applicator according to claim 2, further defined by said means to vent the tube to atmosphere comprising means including said tube defining a radial passage extending exteriorly from the tube interior through the side wall of said tube, a valve stem loosely disposed within said passage and extending exteriorly therethrough, said stem having an enlarged valve head at its interior end for engagement with the portions of the interior surface of the wall circumscribing said passage, and spring loading means for normally urging the valve stem outward.

7. A contact lens applicator comprising a tube closed at one end and open at the other with the open end terminating in a cup having an annular portion for receiving the peripheral convex surface of a contact lens, means for selectively producing a vacuum in said tube, means for selectively venting the interior of said tube to atmosphere, and an ejector member movably mounted adjacent said cup and normally resiliently urged axially towards said annular portion, said ejector member being displaceable away from said annular portion when the convex surface of a lens engages said member and is secured in sealed relation against said annular portion by vacuum produced in said tube and communicating directly with the interior of said cup adjacent said annular portion, said ejector member being resiliently displaceable towards said annular portion when said tube is vented to atmosphere.

8. An apparatus for placing a contact lens upon an eye comprising: a generally cylindrical member opened at one end and formed of deformable material, said cylindrical member defining in part an increased diameter portion functioning as a bulb for forming a low pressure area in said cylindrical member; and, a transparent member coupled to and closing off the other end of said cylindrical member, said one end designed to engage said lens and a tube co-axially disposed within said cylindrical member, said tube functioning as a means of centrally sighting through said apparatus.

References Cited in the file of this patent

UNITED STATES PATENTS

| | | |
|---|---|---|
| 340,856 | Browett | Apr. 27, 1886 |
| 904,679 | Bruton | Nov. 24, 1908 |
| 1,176,353 | Dover | Mar. 21, 1916 |
| 1,298,139 | Wolcott | Mar. 25, 1919 |
| 1,400,573 | Stader | Dec. 20, 1921 |
| 1,431,702 | Smend et al. | Oct. 10, 1922 |
| 1,758,962 | Miller | May 20, 1930 |
| 1,821,810 | Ketzscher | Sept. 1, 1931 |
| 2,127,181 | Mattern | Aug. 16, 1938 |
| 2,384,334 | Olson | Sept. 4, 1945 |
| 2,919,696 | Rinaldy | Jan. 5, 1960 |
| 3,031,918 | Moyers | May 1, 1962 |

FOREIGN PATENTS

| | | |
|---|---|---|
| 11,952 | Great Britain | May 13, 1897 |
| 432,042 | Great Britain | July 19, 1935 |